United States Patent [19]

Abe et al.

[11] Patent Number: 4,652,514

[45] Date of Patent: Mar. 24, 1987

[54] OPTICAL INFORMATION RECORDING MEDIUM

[75] Inventors: Michiharu Abe; Hideaki Oba, both of Yokohama, Japan

[73] Assignee: Ricoh Co., Ltd., Tokyo, Japan

[21] Appl. No.: 652,791

[22] Filed: Sep. 20, 1984

Related U.S. Application Data

[63] Continuation-in-part of Ser. No. 544,747, Oct. 24, 1983, abandoned.

[30] Foreign Application Priority Data

Oct. 28, 1982 [JP] Japan ............................... 57-188265

[51] Int. Cl.$^4$ .................... G03C 1/733; G03C 1/72
[52] U.S. Cl. .................................. 430/343; 430/341; 430/346; 430/495; 430/945; 430/964
[58] Field of Search ............... 430/495, 945, 341, 343, 430/346, 581, 583, 588, 594, 964; 346/135.1, 76 L

[56] References Cited

U.S. PATENT DOCUMENTS

| | | | |
|---|---|---|---|
| 4,050,938 | 9/1977 | Smith et al. | 430/550 |
| 4,173,483 | 11/1979 | Habu et al. | 430/1 |
| 4,230,939 | 10/1980 | deBont et al. | 346/76 L |
| 4,320,489 | 3/1982 | Crandall et al. | 346/135.1 |
| 4,334,005 | 6/1982 | Adin et al. | 430/203 |
| 4,418,135 | 11/1983 | Beeson et al. | 430/93 |
| 4,460,665 | 7/1984 | Kunikane et al. | 430/945 |
| 4,465,767 | 8/1984 | Oba et al. | 430/945 |
| 4,600,625 | 7/1986 | Abe et al. | 430/271 |

OTHER PUBLICATIONS

Colour Index, Third Edition, vol. 4, pp. 4438 and 4440, 1971, Society of Dyers and Colourists.

*Primary Examiner*—Richard L. Schilling
*Attorney, Agent, or Firm*—Flynn, Thiel, Boutell & Tanis

[57] ABSTRACT

An optical information recording medium which comprises the provision of a thin film (recording layer) formed of a cyanine coloring matter and a transition metal complex being superior in long wavelength range light absorbability to said coloring matter on a transparent or opaque substrate and which permits writing and reading by using laser beam.

107 Claims, No Drawings

OPTICAL INFORMATION RECORDING MEDIUM

This is a continuation-in-part of application Ser. No. 544,747 filed Oct. 24, 1983, now abandoned.

BACKGROUND OF THE INVENTION (a) Field of the Invention

The present invention relates to a recording medium, in particular relates to an optical information recording medium for use in writing and reading with a high density energy beam such as laser beam.

(b) Description of the Prior Art

A great number of optical information recording mediums for use in writing and reading with a high density energy beam (for instance, such as laser beam) have hitherto been proposed.

As one typical example of such recording mediums there is known an optical information recording medium which comprises a substrate, a metal reflective film and a translucent coloring layer containing a coloring matter. This recording medium is designed so that the laser beam entering the coloring matter-containing translucent coloring layer reaches the metal reflective film and is reflected therefrom so as to detect the reflected beam with ease, wherein said metal reflective film is provided for the purpose of supplementing the deficient amount of the beam reflected from the coloring layer alone. However, the provision of the metal reflective film is defective in that it causes the complicated construction of the information recording medium as well as high costs.

In view of this, it has recently been proposed to eliminate the above mentioned defects by using a high-reflective and bronze-lustered organic coloring matter-containing monolayer film. In particular, when using, as a recording film, a highly light absorptive cyanine coloring matter and making said recording film have a thickness of 300 Å to 600 Å, there can be obtained a light absorption reflective film which exhibits metal luster (reflective index: 20 to 30%) and further which permits to effect recording with laser beam and reflective reading with laser beam. In particular, the use of semiconductor laser with wavelength of 750 to 850 nm as the laser source, is advantageous in that a means (an information recording regenerating means which functions to write and read the information by exposing a rotating disk-shaped information recording medium to laser beam radiation) may be minimized.

SUMMARY OF THE INVENTION

The first object of the present invention is to provide an optical information recording medium which, in spite of containing a cyanine coloring matter in a light absorption reflective film (recording layer), exhibits a superior stability to light radiation and further displays a high reflective index thereto.

The second object of the present invention is to provide an optical information recording medium which is uniform in quality and further is high in the S/N (signal to noise ratio).

The inventors of this application have carried out various studies and investigations for the purpose of achieving the above objects to find that the coexistence of a specific transition metal complex with a cyanine coloring matter improves especially the stability to light radiation of the resulting optical information recording medium and moreover there is no inconvenience to be caused by the coexistence of said transition metal complex. The present invention has been completed on the basis of this finding.

That is, the present invention is related to an optical information recording medium comprising a substrate and a recording layer (light absorption reflective layer) provided thereon, characterized in that said recording layer is consisted essentially of a cyanine coloring matter and a transition metal complex which exhibits a more superior absorbability to light in the long wavelength range than said coloring matter does.

The present invention permits the provision of a protective layer on the recording layer and an adhesive layer under the recording layer (namely, between the substrate and the recording layer) as occasion demands.

The optical information recording medium according to the present invention will be explained in more detail hereinafter.

The recording layer is suitable to have such a metal-like reflection as the coloring matter displays at a specific light wavelength region, in practice to have a reflection index of 20% or more, preferably about 30%, against the wavelength of laser used for writing and reading. This reflection is different from said metal-like reflection because the former has a particular color, but is permitted to have a high reflection index against the wavelength of laser beam used in recording and regenerating, whereby the amount of light for use in information reading and accordingly the S/N of reading signal can be enhanced.

The cyanine coloring matter used in the present invention is generally known as the coloring matter for sensitizing the spectral sensitivity of silver halide. As the especially desirable example thereof there can be enumerated the compounds represented by the following general formulas I and II:

and

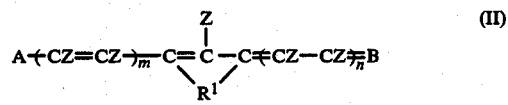

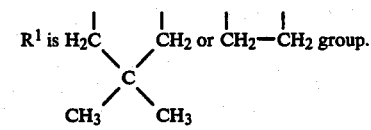

$R^1$ is $H_2C$ $CH_2$ or $CH_2-CH_2$ group.

B is nitrogenous heterocycle which will be exemplified hereinafter:

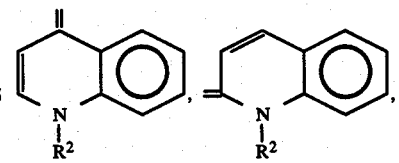

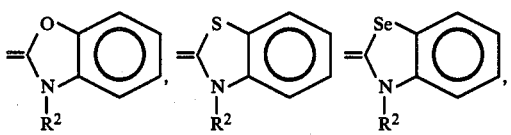

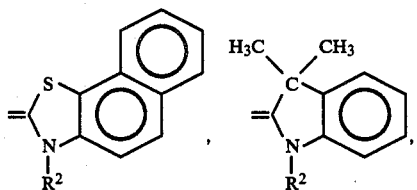

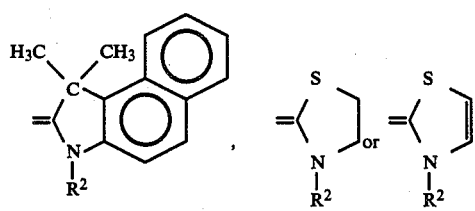

group, or an alkyl, alkoxy, hydroxy, acetyl, aryl or halogen substituent thereof, in which $R^2$ is an alkyl, alkoxyalkyl, hydroxyalkyl, aralkyl, carboxyalkyl, carboxylato alkyl bonded with an alkali metal cation, sulfoalkyl or sulfonatoalkyl group.

A is a nitrogenous heterocycle having a positive charge, which will be exemplified hereinafter:

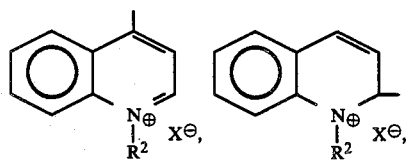

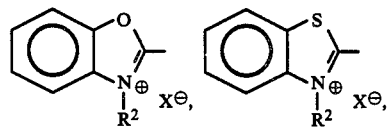

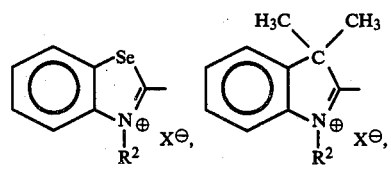

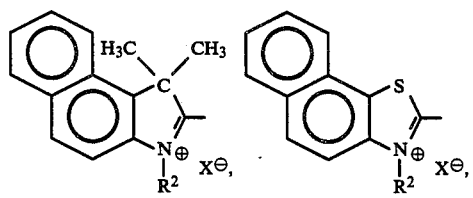

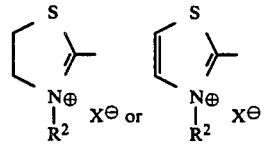

group, or an alkyl, alkoxy, hydroxy, acetyl, aryl or halogen substituent thereof, in which $R^2$ is the same as in said B and X is a counter ion, for instance, such as halogen.

Z is H, —OH, —COOH, halogen, $C_1$-$C_5$ alkyl, phenyl, N-substituted amino, N-substituted alkyl, substituted or unsubstituted aryl, or —COOR' (wherein R' is $C_1$-$C_5$ alkyl, phenyl or substituted phenyl group) group, and said Z, when plural, may be same or different, and m and n are each an integer of 0, 1, 2 or 3 with the proviso $m+n \leq 3$.

In this connection, it is to be noted that the cyanine coloring matters disclosed in U.S. Pat. Nos. 1,846,301; 1,846,302; 1,990,507; 2,112,140; 2,739,964; 2,503,776; 2,519,001; 2,666,761; 2,734,900; 2,739,149 and 3,690,891 Specifications may be used in the present invention. In particular, the cyanine coloring matter with indole or naphthoindole neucleus is high in light stability and so used suitably.

These suitable cyanine coloring matters are represented by the following general formula III:

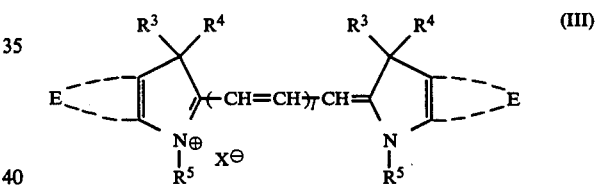

(III)

(wherein, $R^3$, $R^4$ and $R^5$ may be the same or different, and each stands for $C_1$-$C_6$ alkyl; X stands for halogen, perhalogenate, boron tetrafluoride, toluenesulfonic acid or alkylsulfonic acid; E stands for a benzene ring or a naphthyl ring and a substituent such as alkyl, alkoxy, hydroxy, carboxyl, halogen, allyl or alkylcarboxyl may be or may be not present on each ring; and l is an integer of 1-3.).

Of the above enumerated cyanine coloring matter represented by the general formula III, the especially usable one for the present invention is the one represented by the following general formula IV:

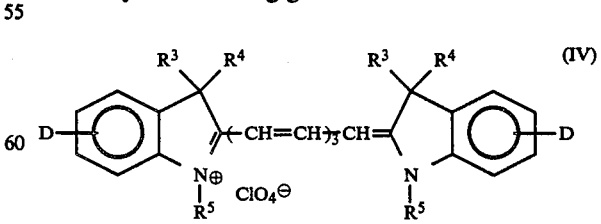

(IV)

(wherein, $R^3$, $R^4$ and $R^5$ are the same as defined above and D stands for a halogen atom.), and the more especially usable cyanine coloring matter is the one represented by the following general formula V:

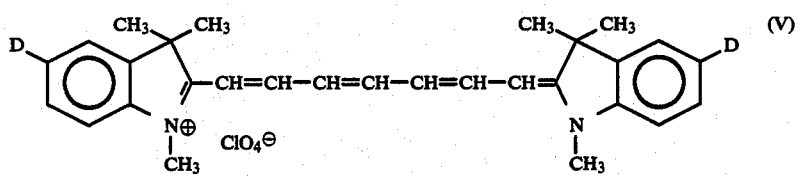

(wherein, D stands for a halogen atom selected from fluorine, chlorine, bromine and iodine.).

The cyanine coloring matter represented by this general formula V is especially superior in thermal resistance and light resistance. Although the reason has not been fully elucidated yet, it may be considered that those superior properties have been caused through the influence of the large ion radius of a counter ion and the electron attractive effect of a halogen on an indole ring.

As the cyanine coloring matter especially usable for the present invention (namely, the cyanine coloring matter represented by the general formula V), there may be enumerated as follows: 1-methyl-2-[7-(1-methyl-3,3-dimethyl-5-chloro-2-indolinylidene)-1,3,5-heptatrienyl]-3,3-dimethyl-5-chloro-indolium perchlorate, 1-methyl-2-[7-(1-methyl-3,3-dimethyl-5-bromo-2-indolinylidene)-1,3,5-heptatrienyl]-3,3-dimethyl-5-bromo-indolium perchlorate, 1-methyl-2-[7-(1-methyl-3,3-dimethyl-5-iodo-2-indolinylidene)-1,3,5-heptatrienyl]-3,3-dimethyl-5-iodo-indolium perchlorate.

Whilst, the transition metal complexes used in the present invention may be those represented by the following structural formula or their quaternary ammonium salts:

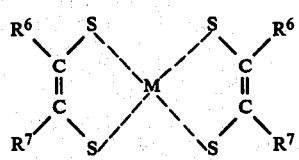

(wherein, M is a transition metal selected from the group consisting of nickel, platinum and palladium, $R^6$ and $R^7$ may be the same or different, $R^6$ and $R^7$ each is an alkyl group, a phenyl group, an alkyl-substituted phenyl group, an alkoxy-substituted phenyl group or a dialkylaminophenyl group or $R^6$ and $R^7$ may cooperate to form a ring.).

As the transition metal complexes referred to above there can be enumerated bis(4-diethylaminodithiobenzyl)nickel, bis(4-dimethylaminodithiobenzyl)nickel, bis(3,4,5,6-tetrachloro-1,2-dithiophenyl)nickel, tetrabutylammonium, bis(4-chloro-1,2-dithiophenyl)nickel tetrabutylammonium, bis(1,4-dimethyl-2,3-dithiophenyl)nickel tetrabutylammonium, bis(1,2-dithiophenyl)nickel tetrabutylammonium, bis(3,4,5,6-tetrachloro-1,2-dithiophenyl)platinum tetrabutylammonium, bis(1,4-dimethyl-2,3-dithiophenyl)palladium tetrabutylammonium, and the like. The bis(4-diethylaminodithiobenzyl)nickel is known to be a substance which is absorbent of light in the vicinity of about wavelength 1000 nm.

The substrate materials used in the present invention may be those well known to the ordinary worker in this art and may be either transparent or opaque to the laser beam used. However, when writing record is effected from the substrate side with laser beam, the substrate material must be transparent to writing laser beam. On the other hand, when writing record is effected from the side opposite to the substrate, namely from the surface of the recording layer, there is no necessity that the substrate material should be transparent to writing laser beam. However, when reading regeneration is carried out with a transmitted light, the substrate material must be transparent to reading laser beam, while when reading regeneration is carried out with a reflected light, the substrate material may be either transparent or opaque to reading laser beam. Referring to the quality of the substrate material, there may be employed the supports generally used for recording elements made of glass, quartz, ceramics, plastics, paper, plate-like or foil-like metal and the like. Among them, plastics are especially suitable in the points of safety, improved recording sensitivity, flatness, light weight, workability and the like. The typical plastics include vinyl chloride resin, vinyl acetate resin, acrylic resin, methacrylic resin, polyester resin, nitrocellulose, polyethylene resin, polypropylene resin, polyamide resin, polystyrene resin, polycarbonate resin, epoxy resin and the like.

The recording layer used in the present invention can be formed by preparing a solution which has dissolved the essential material, namely the cyanine coloring matter and the transition metal complex, and together with a binder and/or an addition agent in case of necessity, in an organic solvent and by coating the substrate with the resulting solution.

As the organic solvent there can be used such, for instance, as methanol, methylenedichloride, 1,2-dichloroethane and the like. Coating is carried out in a usual manner such as spraying, roller coating, dipping, rotary coating and the like. Of these coating methods, spinning is most preferable. As example of binder there can be enumerated polyvinyl butyral, cellulose acetate, polyvinyl acetate, acrylic or methacrylic resin, polyester resin, polyamide resin or the like, but it is desirable that such binders should not be used.

Said addition agent is also an optional component. As the example of this addition agent there can be enumerated an antioxidant (for instance, phenol resin).

The mixing ratio of the cyanine coloring matter and the transition metal complex in the recording layer is that the latter (transition metal complex) is 1 to 80 parts by weight, preferably 4 to 40 parts by weight against 100 parts by weight of the former (cyanine coloring matter). When the latter is more than 80 parts by weight against 100 parts by weight of the former it is not preferable because the sensitivity deteriorates and the S/N is lowered. On the other hand, when the latter is less than 1 part by weight it is not preferable because the stability to light radiation is lost. And, when the optional components (binder, antioxidant and the like) are contained in this recording layer, the amounts of these optional components should be less than 70% by weight of the total amount of the recording layer.

The cyanine coloring matter and the transition metal complex each may be used either alone or in mixture of two kinds or more. In the formation of the recording layer, however, the keenest attention should be paid to the fact that the transition metal complex used herein should be absorbent of the light in the wavelength range longer than the wavelength range of which the cyanine coloring matter used herein is absorbent. If this condition is not satisfied, there will be brought about such a disadvantage that the effect of the stability to light radiation rendered to the cyanine coloring matter is diminished. The reason why said effect is brought about is not always clarified, but is considered to consist in that the excited energy of the cyanine coloring matter is received by the transition metal complex and escaped. That is, it may be considered that since the transition metal complex is more absorptive to short wavelength light than the cyanine coloring matter, transfer of said energy is difficult to take place in the former.

In any case, there is no positive necessity of the recording medium of the present invention being provided with a reflective layer because the recording layer of the present invention comprising the cyanine coloring matter and the transition metal complex exhibits a superior index of reflection.

The thickness of the recording layer is in the range of 100–1000 Å, preferably 300–600 Å, more preferably 300–500 Å.

The adhesive layer (undercoat layer), as stated above, is provided between the substrate and the recording layer as occasion demands.

Taking the thermal conductivity into consideration, this adhesive layer may be formed using a heat insulating resin material or an inorganic material in a conventional manner such as vapordeposition coating or the like.

As the resins used herein there can be enumerated vinyl chloride resin, vinyl acetate resin, acrylic or methacrylic resin, polyester such as polyethylene terephthalate, celluloses such as nitro-cellulose, polyamide, polycarbonate, epoxy resin, polyimide, polysulfone, and the like. And, as the inorganic compounds used herein there can be enumerated SiO, $SiO_2$, $TiO_2$ and the like. The use of polyimide and polysulfone is particularly preferable. The thickness of the adhesive layer is in the range of about 0.05 to 10 μm, preferably in the range of about 0.1 to 0.5 μm.

The protective layer, as stated above, is formed on the recording layer as occasion demands. This layer may be formed by using the usual method of vapor deposition, coating or the like, and its thickness is suitably in the range of about 0.1 to 10 μm, preferably in the range of about 0.5 to 1.0 μm. The materials used in the formation of the protective layer may be either organic or inorganic so far as the thin recording layer is protected thereby.

The concrete examples of organic materials are disclosed in Japanese Laid Open Patent Application No. 96716/1974 Specification, Japanese Laid Open Patent Application No. 59626/1976 Specification, Japanese Laid Open Patent Application No. 75523/1976 Specification, Japanese Laid Open Patent Application No. 88024/1976 Specification, Japanese Laid Open Patent Application No. 134633/1976 Specification, and the like. Among them, polystyrene, polyethylene terephthalate and ethylene-vinyl acetate copolymer are used profitably. As the concrete examples of inorganic materials, on the other hand, there may be enumerated $Al_2O_3$, $SiO_2$, SiO, MgO, ZnO, $MgF_2$, $CuF_2$ and the like.

The lasers used in the optical information recording medium according to the present invention include $N_2$, He-Cd, Ar, He-Ne, ruby, semi-conductor, dye lasers. Among them, the semi-conductor laser is suitable especially from the viewpoints of light weight, easiness of handling, compactness and the like.

The recording medium according to the present invention is of a superior lightproofing preservability while maintaining the sensitivity and the S/N at high levels, which is evident from Examples and Comparative Example referred to afterwards.

EXAMPLES

EXAMPLE 1

As the cyanine coloring matter there was employed NK 2014 produced by Nihon Kanko Shikiso K. K. and represented by the following structural formula:

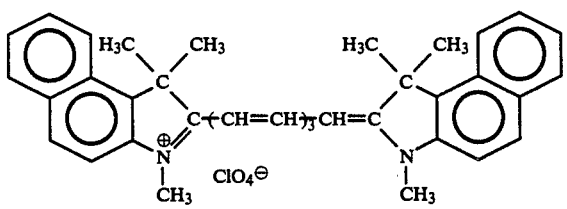

And, a 1,2-dichloroethane solution containing NK 2014 (1.25% by weight) and bis(4-diethylaminodithiobenzyl)nickel (0.05% by weight) was applied on an acryl substrate (ACRYRITE produced by Mitsubishi Rayon K. K.) by rotary coating. Thus, an about 500 Å-thick recording film was formed and a recording medium was prepared. In this connection, it is to be noted that the above mentioned structural formula, in fact, is sometimes represented as follows:

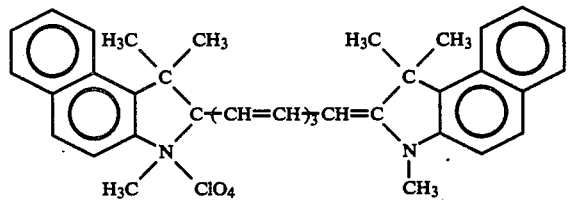

COMPARATIVE EXAMPLE 1

In order to make a comparison with Example 1, an about 500 Å-thick recording film was formed of the coloring matter NK 2014 alone, and thus a control recording medium was prepared.

EXAMPLE 2

A recording medium was prepared according to the exactly same procedure as Example 1 except that bis(4-dimethylaminodithiobenzyl)nickel was employed as the nickel complex.

EXAMPLE 3

As the cyanine coloring matter there was employed NK 125 produced by Nihon Kanko Shikiso K. K. and represented by the following structural formula:

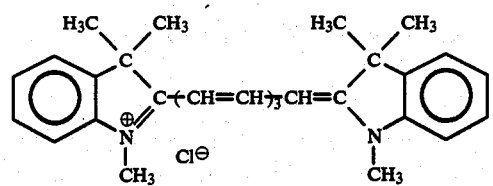
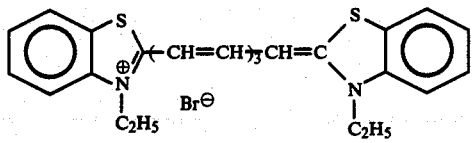

And, a 1,2-dichloroethane solution containing NK 125 (1.25% by weight) and bis(1,4-dimethyl-2,3-dithiophenyl)nickel tetrabutylammonium (0.1% by weight) was rotary coated on an acryl substrate (ACRYRITE L produced by Mitsubishi Rayon K. K.) provided with a light setting resin guide groove to form an about 450 Å-thick recording film. Thus, a recording medium was prepared.

EXAMPLE 4

A recording medium was prepared by repeating the exactly same procedure as Example 1 except that NK 1666 produced by Nihon Kanko Shikiso K. K. and represented by the following structural formula: was employed as the cyanine coloring matter and bis(3,4,5,6-tetrachloro-1,2-dithiophenyl)platinum tetrabutylammonium was employed as the metal complex.

EXAMPLE 5

The coating solution of Example 1 was admixed further with 0.1% by weight of polyvinyl butyral resin as a binder. This solution was applied on an acryl substrate (ACRYRITE AR produced by Mitsubishi Rayon K. K.) by rotary coating to form a recording film which is about 550 Å thick, and thus a recording medium was prepared.

EXAMPLES 6 TO 20

By using the cyanine coloring matters (each 1.25% by weight) shown in the following table-1 and bis(4-diethylaminodithiobenzyl)nickel (0.05% by weight) there were prepared coating solutions. These solutions were applied on substrates by rotary coating to form recording films. Thus, recording mediums were prepared.

TABLE 1

| Example No. | Coloring matter | Solvent | Film thickness (μm) | Substrate |
|---|---|---|---|---|
| 6 | | methanol | 0.4 | glass |
| 7 | | methylene dichloride | 0.8 | acrylic resin |
| 8 | | methylene dichloride | 0.04 | acrylic resin |
| 9 | | methylene dichloride | 0.05 | acrylic resin |
| 10 | | methylene dichloride | 0.04 | acrylic resin |

TABLE 1-continued

| Example No. | Coloring matter | Solvent | Film thickness (μm) | Substrate |
|---|---|---|---|---|
| 11 | [naphthobenzothiazole dimer with −(CH=CH)$_2$−CH= bridge, N−C$_2$H$_5$, Br$^-$] | ethanol | 0.06 | acrylic resin |
| 12 | [benzothiazole dimer with −(CH=CH)$_3$−CH= bridge, N−C$_2$H$_5$, Cl$^-$] | ethanol | 0.06 | acrylic resin |
| 13 | [naphthobenzothiazole dimer with −(CH=CH)$_3$−CH= bridge, N−C$_2$H$_5$, I$^-$] | methylene dichloride | 0.06 | acrylic resin |
| 14 | [quinoline dimer with −(CH=CH)$_3$−CH= bridge, N−C$_2$H$_5$, Cl$^-$] | ethanol | 0.05 | acrylic resin |
| 15 | [benzothiazole dimer with −(CH=CH)$_2$−CH= bridge, N−C$_2$H$_5$, I$^-$] | methylene dichloride | 0.06 | acrylic resin |
| 16 | [benzothiazole dimer with −(CH=CH)$_3$−CH= bridge, N−C$_2$H$_5$, I$^-$] | methylene dichloride | 0.05 | acrylic resin |
| 17 | [benzothiazole dimer with −(CH=CH)$_2$−C(COCH$_3$)=CH−CH=CH− bridge, N−C$_2$H$_5$, ClO$_4^-$] | methylene dichloride | 0.04 | acrylic resin |
| 18 | [quinoline dimer with −CH=CH−CH= bridge, N−C$_2$H$_5$, I$^-$] | methylene dichloride | 0.05 | acrylic resin |
| 19 | [benzothiazole dimer with −(CH=CH)$_2$−CH= bridge, N−C$_2$H$_5$, Br$^-$] | methylene dichloride | 0.03 | acrylic resin |

TABLE 1-continued

| Example No. | Coloring matter | Solvent | Film thickness (μm) | Substrate |
|---|---|---|---|---|
| 20 | (structure: bis-benzothiazole cyanine with triphenylamine center and cyclopentene, ClO₄⁻ counterion) | methylene dichloride | 0.04 | acrylic resin |

EXAMPLES 21 TO 23

By using the cyanine coloring matters (each 1.25% by weight) shown in the following table-2 and bis(3,4,6-trichloro-1,2-dithiophenyl)nickel tetrabutylammonium (0.05% by weight) there were prepared coating solutions. These solutions were applied on substrates by rotary coating to form recording films. Thus, recording mediums were prepared.

TABLE 2

| Example No. | Coloring matter | Solvent | Film thickness (μm) | Substrate |
|---|---|---|---|---|
| 21 | (indolenine cyanine dimer with Cl substituents, N-CH₃, ClO₄⁻) | 1,2-dichloroethane | 0.05 | acrylic resin |
| 22 | (indolenine cyanine dimer with Br substituents, N-CH₃, ClO₄⁻) | 1,2-dichloroethane | 0.05 | acrylic resin |
| 23 | (indolenine cyanine dimer with I substituents, N-CH₃, ClO₄⁻) | 1,2-dichloroethane | 0.05 | acrylic resin |

These samples were recorded and regenerated using the HeNe laser beam (wavelength: 630 nm) or the semiconductor laser beam (wavelength: 790 nm) each stopped down to 1.54 μm under the conditions: laser power 4 mW, recording frequency 0.6875 and pit distance 1.8 μm (pit length 0.9 μm). These regenerated signals were subjected to spectral analysis at the scanning filter band width of 30 KHz by means of Tracking scope TR4110 manufactured by Takeda Riken to measure the S/N (1). At the same time, both the reflection percentage (1) and the absorption percentage (1) were measured.

Furthermore, these samples were measured with reference to the S/N (2), the reflection percentage (2) and the absorption percentage (2) after 120 hours' exposure to the radiation of the 54,000-lux light from a tungsten lamp.

The thus obtained results were as shown in Table-3.

TABLE 3

| | S/N (dB) | | Reflection percentage (%) | | Absorption percentage (%) | |
|---|---|---|---|---|---|---|
| | (1) | (2) | (1) | (2) | (1) | (2) |
| Example 1 | 50 | 50 | 28 | 20 | 60 | 58 |
| 2 | 50 | 50 | 28 | 21 | 60 | 57 |
| 3 | 49 | 49 | 29 | 24 | 57 | 55 |
| 4 | 49 | 49 | 28 | 22 | 56 | 53 |
| 5 | 50 | 50 | 27 | 20 | 53 | 51 |
| 6 | 49 | 49 | 28 | 20 | 57 | 55 |
| 7 | 50 | 50 | 26 | 20 | 58 | 56 |
| 8 | 52 | 52 | 28 | 21 | 60 | 57 |
| 9 | 51 | 51 | 29 | 22 | 62 | 60 |
| 10 | 49 | 49 | 27 | 21 | 59 | 57 |
| 11 | 52 | 52 | 28 | 21 | 58 | 55 |
| 12 | 51 | 51 | 26 | 20 | 60 | 58 |
| 13 | 51 | 51 | 26 | 19 | 58 | 55 |
| 14 | 50 | 50 | 28 | 21 | 56 | 54 |
| 15 | 53 | 53 | 27 | 21 | 62 | 60 |
| 16 | 53 | 53 | 28 | 22 | 61 | 58 |
| 17 | 49 | 49 | 26 | 19 | 52 | 48 |
| 18 | 49 | 49 | 29 | 21 | 59 | 57 |
| 19 | 52 | 52 | 29 | 20 | 60 | 58 |

TABLE 3-continued

| | S/N (dB) | | Reflection percentage (%) | | Absorption percentage (%) | |
|---|---|---|---|---|---|---|
| | (1) | (2) | (1) | (2) | (1) | (2) |
| 20 | 50 | 50 | 27 | 20 | 58 | 54 |
| 21 | 53 | 53 | 28 | 26 | 62 | 61 |
| 22 | 52 | 52 | 26 | 23 | 60 | 59 |
| 23 | 52 | 52 | 26 | 23 | 62 | 61 |
| Comparative example 1 | 50 | 48 | 28 | 16 | 60 | 52 |

Note (1) The samples of Examples 6, 8, 9, 10, 11, 15, 18 and 19 were recorded and regenerated using the HeNe laser beam (wavelength: 630 nm).
Note (2) The samples other than the aforesaid samples were recorded and regenerated using the semiconductor laser beam (wavelength: 790 nm).

We claim:

1. An optical information recording medium, comprising a substrate and a recording layer on said substrate, said recording medium being free of a reflective metal layer, said recording layer being a monolayer made of a mixture consisting essentially of cyanine coloring matter and a transition metal complex, said transition metal complex being superior in absorbability of long wavelength range light in comparison to said cyanine coloring matter, said recording layer having a thickness of from 100 to 1000 Angstrom units, said recording layer containing from 1 to 80 parts by weight of said transition metal complex per 100 parts by weight of said cyanine coloring matter.

2. An optical information recording medium as claimed in claim 1 in which said recording layer contains from 4 to 40 parts by weight of said transition metal complex per 100 parts by weight of said cyanine coloring matter.

3. An optical information recording medium as claimed in claim 1 in which the thickness of said recording layer is from 300 to 600 Angstrom units.

4. An optical information recording medium as claimed in claim 1 in which said recording layer is free of a binder.

5. An optical information recording medium as claimed in claim 1 in which said recording layer has been formed on said substrate by the spin coating method.

6. An optical information recording medium as claimed in claim 1 in which said cyanine coloring matter is a compound having two unsubstituted or substituted heterocyclic groups each having a nitrogen atom in the ring, said heterocyclic groups being bonded by at least one methine chain, a substituted methine chain or a group having a methine chain or an unsubstituted methine chain.

7. An optical information recording medium as claimed in claim 6 in which said recording layer contains from 4 to 40 parts by weight of said transition metal complex per 100 parts by weight of said cyanine coloring matter.

8. An optical information recording medium as claimed in claim 6 in which the thickness of said recording layer is from 300 to 600 Angstrom units.

9. An optical information recording medium as claimed in claim 6 in which said recording layer is free of a binder.

10. An optical information recording medium as claimed in claim 6 in which said recording layer has been formed on said substrate by the spin coating method.

11. An optical information recording medium as claimed in claim 1 in which said cyanine coloring matter has a positive charge.

12. An optical information recording medium as claimed in claim 11 in which said recording layer contains from 4 to 40 parts by weight of said transition metal complex per 100 parts by weight of said cyanine coloring matter.

13. An optical information recording medium as claimed in claim 11 in which the thickness of said recording layer is from 300 to 600 Angstrom units.

14. An optical information recording medium as claimed in claim 11 in which said recording layer is free of a binder.

15. An optical information recording medium as claimed in claim 11, in which said recording layer has been formed on said substrate by the spin coating method.

16. An optical information recording medium according to claim 1 wherein said coloring matter is at least one compound selected from the group of compounds having the formulas:

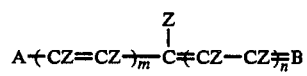

and

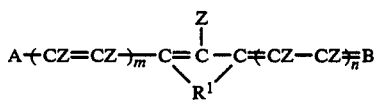

wherein $R^1$ is

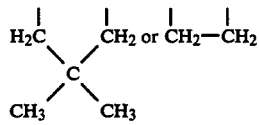

group; B is

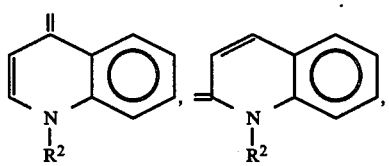

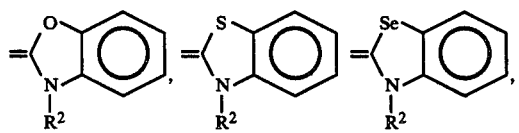

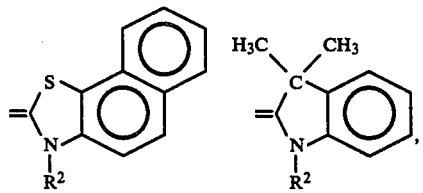

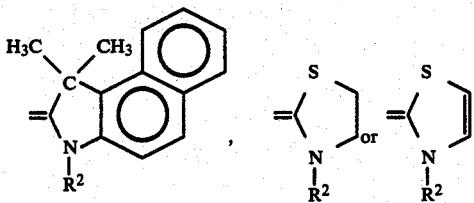

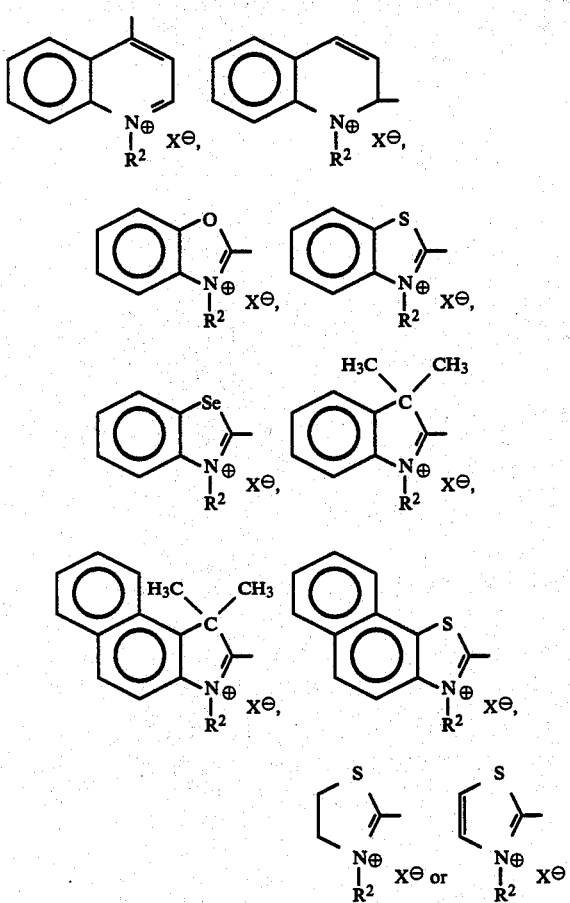

group, which group can have an alkyl, alkoxy, hydroxy, acetyl, aryl or halogen substituent, and in which $R^2$ is alkyl, alkoxyalkyl, hydroxyalkyl, aralkyl, carboxyalkyl, carboxylato alkyl bonded with an alkali metal cation, sulfoalkyl or sulfonatoalkyl; A is group, which group can have an alkyl, alkoxy, hydroxy, acetyl, aryl or halogen substituent, and in which $R^2$ is the same as defined above; X is a counter ion; Z is H, —OH, —COOH, halogen, $C_1$-$C_5$ alkyl, phenyl, N-substituted amino, N-substituted alkyl, substituted or unsubstituted aryl, or —COOR' wherein R' is $C_1$-$C_5$ alkyl, phenyl or substituted phenyl group, and when more than one Z group is present, they can be the same or different; and m and n are each an integer of 0, 1, 2 or 3 with the proviso $m+n \leq 3$.

17. An optical information recording medium as claimed in claim 16 in which said recording layer contains from 4 to 40 parts by weight of said transition metal complex per 100 parts by weight of said cyanine coloring matter.

18. An optical information recording medium as claimed in claim 16 in which the thickness of said recording layer is from 300 to 600 Angstrom units.

19. An optical information recording medium as claimed in claim 16 in which said recording layer is free of a binder.

20. An optical information recording medium as claimed in claim 16 in which said recording layer has been formed on said substrate by the spin coating method.

21. An optical information recording medium according to claim 1 wherein said transition metal complex is at least one compound having the following formula, or quaternary ammonium salt thereof:

$$\begin{array}{c} R^6 \\ \diagdown \\ C \\ \| \\ C \\ \diagup \\ R^7 \end{array} \begin{array}{c} S \\ \diagup \\ \diagdown \\ S \end{array} M \begin{array}{c} S \\ \diagdown \\ \diagup \\ S \end{array} \begin{array}{c} R^6 \\ \diagup \\ C \\ \| \\ C \\ \diagdown \\ R^7 \end{array}$$

wherein M is a transition metal selected from the group consisting of nickel, platinum and palladium, $R^6$ and $R^7$ can be the same or different and each is alkyl, phenyl, alkyl-substituted phenyl, alkoxy-substituted phenyl or dialkylaminophenyl, or $R^6$ and $R^7$ may cooperate to form a ring.

22. An optical information recording medium as claimed in claim 21 in which said recording layer contains from 4 to 40 parts by weight of said transition metal complex per 100 parts by weight of said cyanine coloring matter.

23. An optical information recording medium as claimed in claim 21 in which the thickness of said recording layer is from 300 to 600 Angstrom units.

24. An optical information recording medium as claimed in claim 21 in which said recording layer is free of a binder.

25. An optical information recording medium as claimed in claim 21 in which said recording layer has been formed on said substrate by the spin coating method.

26. An optical information recording medium according to claim 1 wherein said transition metal complex is selected from the group consisting of bis(4-diethylaminodithiobenzyl)nickel, bis(4-dimethylaminodithiobenzyl)nickel, bis(3,4,5,6-tetrachloro-1,2-dithiophenyl)nickel tetrabutylammonium, bis(4-chloro-1,2-dithiophenyl)nickel tetrabutylammonium, bis(1,4-dimethyl-2,3-dithiophenyl)nickel tetrabutylammonium, bis(1,2-dithiophenyl)nickel tetrabutylammonium, bis(3,4,5,6-tetrachloro-1,2-dithiophenyl)platinum tetrabutylammonium and bis(1,4-dimethyl-2,3-dithiophenyl)palladium tetrabutylammonium.

27. An optical information recording medium as claimed in claim 26 in which said recording layer contains from 4 to 40 parts by weight of said transition metal complex per 100 parts by weight of said cyanine coloring matter.

28. An optical information recording medium as claimed in claim 26 in which the thickness of said recording layer is from 300 to 600 Angstrom units.

29. An optical information recording medium as claimed in claim 26 in which said recording layer is free of a binder.

30. An optical information recording medium as claimed in claim 26 in which said recording layer has been formed on said substrate by the spin coating method.

31. An optical information recording medium according to claim 6 wherein said transition metal complex is at least one compound having the following formula, or quaternary ammonium salt thereof:

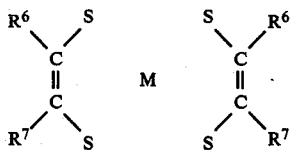

wherein M is a transition metal selected from the group consisting of nickel, platinum and palladium, $R^6$ and $R^7$ can be the same or different and each is alkyl, phenyl, alkyl-substituted phenyl, alkoxy-substituted phenyl or dialkylaminophenyl, or $R^6$ and $R^7$ may cooperate to form a ring.

32. An optical information recording medium as claimed in claim 31 in which said recording layer contains from 4 to 40 parts by weight of said transition metal complex per 100 parts by weight of said cyanine coloring matter.

33. An optical information recording medium as claimed in claim 31 in which the thickness of said recording layer is from 300 to 600 Angstrom units.

34. An optical information recording medium as claimed in claim 31 in which said recording layer is free of a binder.

35. An optical information recording medium as claimed in claim 31 in which said recording layer has been formed on said substrate by the spin coating method.

36. An optical information recording medium according to claim 11 wherein said transition metal complex is at least one compound having the following formula, or quaternary ammonium salt thereof:

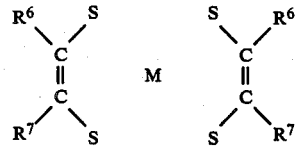

wherein M is a transition metal selected from the group consisting of nickel, platinum and palladium, $R^6$ and $R^7$ can be the same or different and each is alkyl, phenyl, alkyl-substituted phenyl, alkoxy-substituted phenyl or dialkylaminophenyl, or $R^6$ and $R^7$ may cooperate to form a ring.

37. An optical information recording medium as claimed in claim 36 in which said recording layer contains from 4 to 40 parts by weight of said transition metal complex per 100 parts by weight of said cyanine coloring matter.

38. An optical information recording medium as claimed in claim 36 in which the thickness of said recording layer is from 300 to 600 Angstrom units.

39. An optical information recording medium as claimed in claim 36 in which said recording layer is free of a binder.

40. An optical information recording medium as claimed in claim 36 in which said recording layer has been formed on said substrate by the spin coating method.

41. An optical information recording medium according to claim 16 wherein said transition metal complex is at least one compound having the following formula, or quaternary ammonium salt thereof:

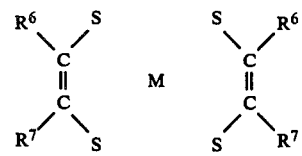

wherein M is a transition metal selected from the group consisting of nickel, platinum and palladium, $R^6$ and $R^7$ can be the same or different and each is alkyl, phenyl, alkyl-substituted phenyl, alkoxy-substituted phenyl or dialkylaminophenyl, or $R^6$ and $R^7$ may cooperate to form a ring.

42. An optical information recording medium as claimed in claim 41 in which said recording layer contains from 4 to 40 parts by weight of said transition metal complex per 100 parts by weight of said cyanine coloring matter.

43. An optical information recording medium as claimed in claim 41 in which the thickness of said recording layer is from 300 to 600 Angstrom units.

44. An optical information recording medium as claimed in claim 41 in which said recording layer is free of a binder.

45. An optical information recording medium as claimed in claim 41 in which said recording layer has been formed on said substrate by the spin coating method.

46. An optical information recording medium according to claim 6 wherein said transition metal complex is selected from the group consisting of bis(4-diethylaminodithiobenzyl)nickel, bis(4-dimethylaminodithiobenzyl)nickel, bis(3,4,5,6-tetrachloro-1,2-dithiophenyl)nickel tetrabutylammonium, bis(4-chloro-1,2-dithiophenyl)nickel tetrabutylammonium, bis(1,4-dimethyl-2,3-dithiophenyl)nickel tetrabutylammonium, bis(1,2-dithiophenyl)nickel tetrabutylammonium, bis(3,4,5,6-tetrachloro-1,2-dithiophenyl)platinum tetrabutylammonium and bis(1,4-dimethyl-2,3-dithiophenyl)palladium tetrabutylammonium.

47. An optical information recording medium as claimed in claim 46 in which said recording layer contains from 4 to 40 parts by weight of said transition metal complex per 100 parts by weight of said cyanine coloring matter.

48. An optical information recording medium as claimed in claim 46 in which the thickness of said recording layer is from 300 to 600 Angstrom units.

49. An optical information recording medium as claimed in claim 46 in which said recording layer is free of a binder.

50. An optical information recording medium as claimed in claim 46 in which said recording layer has been formed on said substrate by the spin coating method.

51. An optical information recording medium according to claim 11 wherein said transition metal complex is selected from the group consisting of bis(4-diethylaminodithiobenzyl)nickel, bis(4-dimethylaminodithiobenzyl)nickel, bis(3,4,5,6-tetrachloro-1,2-dithiophenyl)nickel tetrabutylammonium, bis(4-chloro-1,2-dithiophenyl)nickel tetrabutylammonium, bis(1,4-dimethyl-2,3-dithiophenyl)nickel tetrabutylammonium, bis(1,2-dithiophenyl)nickel tetrabutylammonium, bis(3,4,5,6-tetrachloro-1,2-dithiophenyl)platinum tetrabutylammonium and bis(1,4-dimethyl-2,3-dithiophenyl)palladium tetrabutylammonium.

52. An optical information recording medium as claimed in claim 51 in which said recording layer contains from 4 to 40 parts by weight of said transition metal complex per 100 parts by weight of said cyanine coloring matter.

53. An optical information recording medium as claimed in claim 51 in which the thickness of said recording layer is from 300 to 600 Angstrom units.

54. An optical information recording medium as claimed in claim 51 in which said recording layer is free of a binder.

55. An optical information recording medium as claimed in claim 51 in which said recording layer has been formed on said substrate by the spin coating method.

56. An optical information recording medium according to claim 16 wherein said transition metal complex is selected from the group consisting of bis(4-diethylaminodithiobenzyl)nickel, bis(4-dimethylaminodithiobenzyl)nickel, bis(3,4,5,6-tetrachloro-1,2-dithiophenyl)nickel tetrabutylammonium, bis(4-chloro-1,2-dithiophenyl)nickel tetrabutylammonium, bis(1,4-dimethyl-2,3-dithiophenyl)nickel tetrabutylammonium, bis(1,2-dithiophenyl)nickel tetrabutylammonium, bis(3,4,5,6-tetrachloro-1,2-dithiophenyl)platinum tetrabutylammonium and bis(1,4-dimethyl-2,3-dithiophenyl)palladium tetrabutylammonium.

57. An optical information recording medium as claimed in claim 56 in which said recording layer contains from 4 to 40 parts by weight of said transition metal complex per 100 parts by weight of said cyanine coloring matter.

58. An optical information recording medium as claimed in claim 56 in which the thickness of said recording layer is from 300 to 600 Angstrom units.

59. An optical information recording medium as claimed in claim 56 in which said recording layer is free of a binder.

60. An optical information recording medium as claimed in claim 56 in which said recording layer has been formed on said substrate by the spin coating method.

61. An optical information recording medium comprising a substrate and a recording layer on said substrate, said recording medium being free of a reflective metal layer, said recording layer being a monolayer mode of a mixture consisting essentially of cyanine coloring matter and a transition metal complex, said transition metal complex being superior in absorbability of long wavelength range light in comparison to said coloring matter, and in which said cyanine coloring matter has the formula

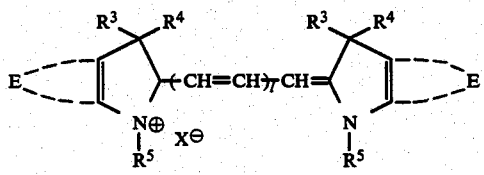

wherein $R^3$, $R^4$ and $R^5$ can be the same or different and each is $C_1$–$C_6$ alkyl; X is halogen, perhalogenate, boron tetrafluoride, toluenesulfonic acid or alkylsulfonic acid; E is a benzene ring, a naphthylene ring, or said rings substituted with alkyl, alkoxy, hydroxy, carboxyl, halogen, alkyl or alkylcarboxyl; and l is an integer of 1 to 3, said recording layer having a thickness of from 100 to 1000 Angstrom units, said recording layer containing from 1 to 80 parts by weight of said transition metal complex per 100 parts by weight of said cyanine coloring matter.

62. An optical information recording medium as claimed in claim 61 in which said recording layer contains from 4 to 40 parts by weight of said transition metal complex per 100 parts by weight of said cyanine coloring matter.

63. An optical information recording medium as claimed in claim 61 in which the thickness of said recording layer is from 300 to 600 Angstrom units.

64. An optical information recording medium as claimed in claim 61 in which said recording layer is free of a binder.

65. An optical information recording medium as claimed in claim 61 in which said recording layer has been formed on said substrate by the spin coating method.

66. An optical information recording medium according to claim 61 wherein said transition metal complex is at least one compound having the following formula, or quaternary ammonium salt thereof:

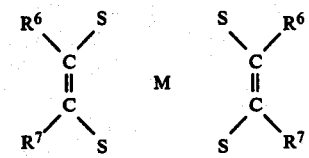

wherein M is a transition metal selected from the group consisting of nickel, platinum and palladium, $R^6$ and $R^7$ can be the same or different and each is alkyl, phenyl, alkyl-substituted phenyl, alkoxy-substituted phenyl or dialkylaminophenyl, or $R^6$ and $R^7$ may cooperate to form a ring.

67. An optical information recording medium as claimed in claim 66 in which said recording layer contains from 4 to 40 parts by weight of said transition metal complex per 100 parts by weight of said cyanine coloring matter.

68. An optical information recording medium as claimed in claim 66 in which the thickness of said recording layer is from 300 to 600 Angstrom units.

69. An optical information recording medium as claimed in claim 66 in which said recording layer is free of a binder.

70. An optical information recording medium as claimed in claim 66 in which said recording layer has been formed on said substrate by the spin coating method.

71. An optical information recording medium according to claim 61 wherein said transition metal complex is selected from the group consisting of bis(4-diethylaminodithiobenzyl)nickel, bis(4-dimethylaminodithiobenzyl)nickel, bis(3,4,5,6-tetrachloro-1,2-dithiophenyl)nickel tetrabutylammonium, bis(4-chloro-1,2-dithiophenyl)nickel tetrabutylammonium, bis(1,4-dimethyl-2,3-dithiophenyl)nickel tetrabutylammonium, bis(1,2-dithiophenyl)nickel tetrabutylammonium, bis(3,4,5,6-tetrachloro-1,2-dithiophenyl)platinum tetrabutylammonium and bis(1,4-dimethyl-2,3-dithiophenyl)palladium tetrabutylammonium.

72. An optical information recording medium as claimed in claim 71 in which said recording layer contains from 4 to 40 parts by weight of said transition metal complex per 100 parts by weight of said cyanine coloring matter.

73. An optical information recording medium as claimed in claim 71 in which the thickness of said recording layer is from 300 to 600 Angstrom units.

74. An optical information recording medium as claimed in claim 71 in which said recording layer is free of a binder.

75. An optical information recording medium as claimed in claim 71 in which said recording layer has been formed on said substrate by the spin coating method.

76. An optical information recording medium according to claim 1 wherein said cyanine coloring matter has the formula:

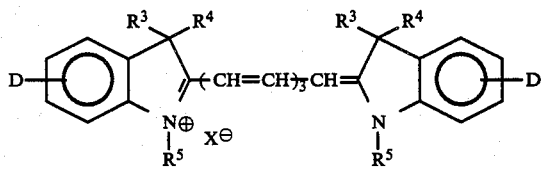

wherein $R^3$, $R^4$ and $R^5$ can be the same or different, and each stands for $C_1$–$C_6$ alkyl; X stands for halogen, perhalogenate, boron tetrafluoride, toluenesulfonic acid or alkylsulfonic acid; and D stands for halogen atom.

77. An optical information recording medium as claimed in claim 76 in which said recording layer contains from 4 to 40 parts by weight of said transistion metal complex per 100 parts by weight of said cyanine coloring matter.

78. An optical information recording medium as claimed in claim 76 in which the thickness of said recording layer is from 300 to 600 Angstrom units.

79. An optical information recording medium as claimed in claim 76 in which said recording layer is free of a binder.

80. An optical information recording medium as claimed in claim 76 in which said recording layer has been formed on said substrate by the spin coating method.

81. An optical information recording medium according to claim 76 wherein said transition metal complex is at least one compound having the following formula, or quaternary ammonium salt thereof:

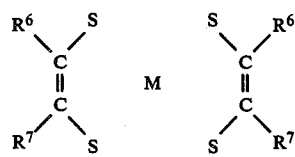

wherein M is a transition metal selected from the group consisting of nickel, platinum and palladium, $R^6$ and $R^7$ can be the same or different and each is alkyl, phenyl, alkyl-substituted phenyl, alkoxy-substituted phenyl or dialkylaminophenyl, or $R^6$ and $R^7$ may cooperate to form a ring.

82. An optical information recording medium as claimed in claim 81 in which said recording layer contains from 4 to 40 parts by weight of said transition metal complex per 100 parts by weight of said cyanine coloring matter.

83. An optical information recording medium as claimed in claim 81 in which the thickness of said recording layer is from 300 to 600 Angstrom units.

84. An optical information recording medium as claimed in claim 81 in which said recording layer is free of a binder.

85. An optical information recording medium as claimed in claim 81 in which said recording layer has been formed on said substrate by the spin coating method.

86. An optical information recording medium according to claim 76 wherein said transition metal complex is selected from the group consisting of bis(4-diethylaminodithiobenzyl)nickel, bis(4-dimethylaminodithiobenzyl)nickel, bis(3,4,5,6-tetrachloro-1,2-dithiophenyl)nickel tetrabutylammonium, bis(4-chloro-1,2-dithiophenyl)nickel tetrabutylammonium, bis(1,4-dimethyl-2,3-dithiophenyl)nickel tetrabutylammonium, bis(1,2-dithiophenyl)nickel tetrabutylammonium, bis(3,4,5,6-tetrachloro-1,2-dithiophenyl)platinum tetrabutylammonium and bis(1,4-dimethyl-2,3-dithiophenyl)palladium tetrabutylammonium.

87. An optical information recording medium as claimed in claim 86 in which said recording layer contains from 4 to 40 parts by weight of said transition metal complex per 100 parts by weight of said cyanine coloring matter.

88. An optical information recording medium as claimed in claim 86 in which the thickness of said recording layer is from 300 to 600 Angstrom units.

89. An optical information recording medium as claimed in claim 86 in which said recording layer is free of a binder.

90. An optical information recording medium as claimed in claim 86 in which said recording layer has been formed on said substrate by the spin coating method.

91. An optical information recording medium comprising a substrate and a recording layer on said substrate, said recording medium being free of a reflective metal layer, said recording layer being a monolayer made of a mixture consisting essentially of cyanine coloring matter and a transition metal complex, said transition metal complex being superior in absorbability of long wavelength range light in comparison to said coloring matter, and wherein said cyanine coloring matter has the formula:

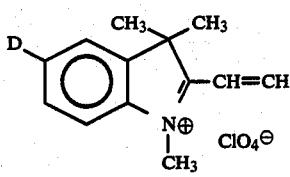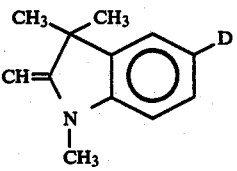

where D is a halogen atom, said recording layer having a thickness of from 100 to 1000 Angstrom units, said recording layer containing 1 to 80 parts by weight of said transition metal complex per 100 parts by weight of said cyanine coloring matter.

92. An optical information recording medium as claimed in claim 91 in which said recording layer contains from 4 to 40 parts by weight of said transition metal complex per 100 parts by weight of said cyanine coloring matter.

93. An optical information recording medium as claimed in claim 91 in which the thickness of said recording layer is from 300 to 600 Angstrom units.

94. An optical information recording medium as claimed in claim 91 in which said recording layer is free of a binder.

95. An optical information recording medium as claimed in claim 91 in which said recording layer has been formed on said substrate by the spin coating method.

96. An optical information recording medium according to claim 91 wherein said transition metal complex is at least one compound having the following formula, or quaternary ammonium salt thereof:

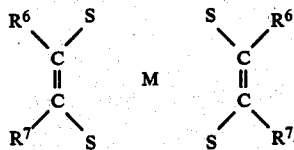

wherein M is a transition metal selected from the group consisting of nickel, platinum and palladium, $R^6$ and $R^7$ can be the same or different and each is alkyl, phenyl, alkyl-substituted phenyl, alkoxy-substituted phenyl or dialkylaminophenyl, or $R^6$ and $R^7$ may cooperate to form a ring.

97. An optical information recording medium as claimed in claim 96 in which said recording layer contains from 4 to 40 parts by weight of said transition metal complex per 100 parts by weight of said cyanine coloring matter.

98. An optical information recording medium as claimed in claim 96 in which the thickness of said recording layer is from 300 to 600 Angstrom units.

99. An optical information recording medium as claimed in claim 96 in which said recording layer is free of a binder.

100. An optical information recording medium as claimed in claim 96 in which said recording layer has been formed on said substrate by the spin coating method.

101. An optical information recording medium according to claim 91 wherein said transition metal complex is selected from the group consisting of bis(4-diethylaminodithiobenzyl)nickel, bis(4-dimethylaminodithiobenzyl)nickel, bis(3,4,5,6-tetrachloro-1,2-dithiophenyl)nickel tetrabutylammonium, bis(4-chloro-1,2-dithiophenyl)nickel tetrabutylammonium, bis(1,4-dimethyl-2,3-dithiophenyl)nickel tetrabutylammonium, bis(1,2-dithiophenyl)nickel tetrabutylammonium, bis(3,4,5,6-tetrachloro-1,2-dithiophenyl)platinum tetrabutylammonium and bis(1,4-dimethyl-2,3-dithiophenyl)palladium tetrabutylammonium.

102. An optical information recording medium as claimed in claim 101 in which said recording layer contains from 4 to 40 parts by weight of said transition metal complex per 100 parts by weight of said cyanine coloring matter.

103. An optical information recording medium as claimed in claim 101 in which the thickness of said recording layer is from 300 to 600 Angstrom units.

104. An optical information recording medium as claimed in claim 101 in which said recording layer is free of a binder.

105. An optical information recording medium as claimed in claim 101 in which said recording layer has been formed on said substrate by the spin coating method.

106. An optical information recording medium as claimed in claim 1 wherein an adhesive layer is provided between said recording layer and said substrate.

107. An optical information recording medium as claimed in claim 1 wherein a protective layer is provided on said recording layer.

* * * * *

UNITED STATES PATENT AND TRADEMARK OFFICE
CERTIFICATE OF CORRECTION

PATENT NO. : 4 652 514
DATED : March 24, 1987
INVENTOR(S) : Michiharu ABE et al

It is certified that error appears in the above-identified patent and that said Letters Patent is hereby corrected as shown below:

At the following locations: Column 19, lines 10-15,
Column 19, lines 43-47,
Column 20, lines 8-13,
Column 22, lines 32-38,
Column 23, lines 62-66, and
Column 25, lines 36-41, change the formula to read as follows:

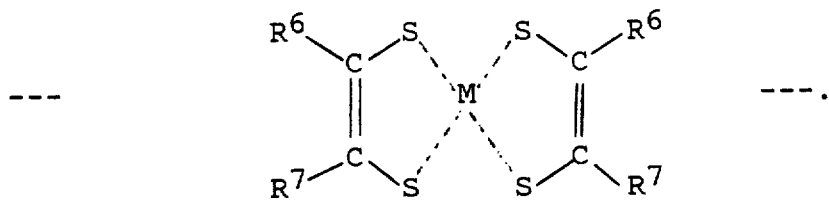

Column 21, line 54; change "mode" to -- made --.

Signed and Sealed this

Fifteenth Day of September, 1987

Attest:

DONALD J. QUIGG

Attesting Officer     Commissioner of Patents and Trademarks